Patented Dec. 16, 1952

2,622,078

UNITED STATES PATENT OFFICE 2,622,078

METHOD OF DIAZOTIZING AROMATIC AMINO-COMPOUNDS TO CORRESPONDING DIAZONIUM COMPOUNDS

Klaas Hinderikus Klaassens and Cornelis Johannes Schoot, Eindhoven, Netherlands, assignors to Hartford National Bank and Trust Company, Hartford, Conn., as trustee No Drawing. Application December 8, 1948, Serial No. 64,256. In the Netherlands February 14, 1948

4 Claims. (Cl. 260—141)

This invention relates to a method of diazotizing aromatic amino compounds to the coresponding diazonium compounds by means of an inorganic diazotizing agent. It is known that, in this case, practically always side reactions occur, notably oxidation, which may render the product impure and sometimes influence the course of the reaction in such manner as to prevent the obtainment of a diazonium compound. In order to avoid these side reactions, diazotization is usually carried out at a temperature of approximately 0° C. so that, as a rule, diazotization occupies considerable time. More particularly in diazotizing amino naphthols and derivatives thereof, salts of copper and zinc have been added to the reaction mixture, thus avoiding the side reactions to a high degree and promoting diazotization in many cases (for instance German patent specifications 171,024, 172,446, 175,593 and 176,618).

The present invention has for its object to counteract the aforesaid side reactions in a different manner, to reduce the reaction time and to increase the purity of the products obtained. The method according to the invention consists in that the diazotization referred to above is carried out in a liquid substantially consisting of a mixture of water and one or more aliphatic, water-soluble ketones. For brevity the expression "ketone" will be used hereinafter.

By adding ketone, side reactions are avoided to a high degree, so that the products obtained are much purer than those obtained in the past. These products exhibit inter alia a much lighter colour, since they do not contain colouring materials or only to a much lower extent. As is well-known these colouring materials result from the aforesaid side reactions.

The quantity of ketone to be added is not bound to sharp limits. To obtain a marked effect, a concentration of at least 20% by volume with respect to the total quantity of water and ketone present in the reaction mixture is required, but the use of concentrations exceeding 75% by volume of ketone sometimes causes difficulties, since the solubility of the reacting materials in the reaction liquid is too low. To obtain optimum results a concentration of approximately 40% by volume is usually advantageous.

Preferably acetone is used, since it can be mixed with water to any desired extent. It is also possible to use other aliphatic ketones, provided that they are sufficiently soluble in water, and they may also be used in combination with acetone.

The influence of the presence of ketone in the reaction mixture is such that, in many cases, that diazotization may take place at temperatures exceeding the usual temperature, for instance exceeding 20° C., and consequently rapidly. With the use of acetone the natural upper limit of the reaction temperature is the boiling point of this material (56° C.). Since the output tends to decline at such high temperatures, the temperature should preferably not exceed 56° C., even with the use of ketones having a higher boiling point. Due to this the reaction time may, in definite cases, be reduced to approximately ⅕ of that required in the absence of ketone.

It is remarkable that, with very different diazotization methods the addition of ketone has a very favourable effect. Ketone always has a favourable influence on the purity, the permissible reaction temperature and the reaction time irrespective of whether diazotization is effected by means of sodium nitrite in strongly acid surroundings or by introducing nitrous gas ($N_2O_3$ or a mixture of NO and $NO_2$ of a composition approximating that of $N_2O_3$) or in a substantially neutrally reacting liquid by means of nitrite and whether use is made of a suspension of a difficultly soluble amino compound or of a solution of a salt thereof.

Of course, the presence of ketone in the reaction liquid influences the ratios of solubility of the different materials instrumental in the reaction. In the case of readily soluble diazonium compounds, for example several ortho-hydroxy-diazonium sulphonic acids and metal salts thereof, this circumstance yields the additional advantage of facilitating the separation from the diazonium compound formed. This advantage is, in itself, also obtainable by adding ketone to the reaction mixture after diazotization in a known manner i. e. without the intermediary of ketone. Therefore, still more ketone, preferably acetone, is added afterwards in order to facilitate the separation of several of the diazonium compounds prepared according to the invention.

It is to be noted that in diazotizing, by means of nitrites, acid aromatic amino-compounds that are to be understood to mean compounds wherein the amino group is directly linked to a benzene ring, as the case may be condensed with other ring systems, and which contain more acid groups than basic groups, the metal salt of the diazonium compound usually also separates from strongly acid solutions with the use of the method according to the invention. This is presumably due to the fact that of these salts, which are mostly better water-soluble than the acid diazonium compound itself, the solubility upon adding ketone, is reduced to a higher degree than that of the diazonium compound. Consequently, in all these cases the method according to the invention provides an easy method of preparing salts of diazonium compounds instead of acids thereof. It has been found that, for instance, the sodium and barium salts of ortho-hydroxy-diazonium-benzene-sulphonic acids on diazotization in the presence of ketone, with 1 equivalent sodium nitrite and barium nitrite respectively and 1 to 2 equivalents of a strong acid (for instance nitric acid) crystallize without these salts being contaminated by the salts of sodium and barium respectively with this strong acid (consequently, for example, by sodium nitrate and barium nitrate respectively). In many cases the acid diazonium compounds themselves can be separated in a simple manner from the salts, for example from a barium salt by means of the calculated quantity of sulphuric acid.

If in the cases referred to, the diazonium compound is to be prepared directly, and consequently not through the intermediary of the salt, diazotization may be effected, likewise with the use of the invention, by introducing a stream of nitrous gas into dilute ketone, in which the corresponding amino has been dissolved or suspended. With this type of diazotizing reactions the use of ketone yields the additional advantage that the nitrous gas is absorbed much more easily than in the absence of ketone.

*Example I*

165 cc. of nitric acid (specific weight 1.4), 460 cc. of water, 250 cc. of acetone and 500 gms. hydroxy-1 amino-2 methyl-6 benzene sulphonic acid-4 are stirred to a homogeneous suspension in a beaker and this suspension is cooled in a freezing mixture to 0° C. Subsequently a solution of 200 gms. sodium nitrite in 375 cc. of water is added dropwise in such manner that the temperature of the reaction mixture does not exceed 7° C. After adding the whole quantity of nitrite solution (which occupies 75 minutes) stirring is continued for 15 minutes and then 375 cc. of acetone are added whilst stirring and cooling to −5° C. The deposit of the sodium salt of hydroxy-1 diazonium-2 methyl-6 benzene sulphonic acid-4 is separated by filtering, washed with a little acetone and dried in the air thus obtaining 485 gms. of the sodium salt of the diazonium compound, which contains 4 molecules water of crystallization.

It is possible to add the nitrite solution more rapidly than as stated above, thus shortening the reaction time, provided that the cooling is effected more intensively.

*Example II*

20 gms. hydroxy-1 amino-2 methyl-6 benzene sulphonic acid-4 are dissolved, if desired whilst gently warming, in a solution of 4 gms. sodium hydroxide and 8 gms. sodium nitrite in 35 cc. of water. The solution obtained is added dropwise, whilst stirring vigorously, to a mixture cooled to 0° C. of 20 cc. of nitric acid (specific weight 1.4) and 14 cc. of acetone. The temperature of the reaction mixture should not exceed 7° C. After the whole quantity has been added dropwise, the diazotizing liquid is warmed to 20° C. and filtered. Subsequently 100 cc. of acetone are added and rapidly cooled to 0° C. The deposit is separated by filtering and washed with a little acetone.

The output amounts to 19 gms. of the sodium salt of the diazonium compound with 4 molecules water of crystallization.

*Example III*

Nitrous gas, of which the composition approximately corresponds to the expression $N_2O_3$ is introduced at 20° C. into a mixture of 50 cc. acetone or butanone, 130 cc. of water and 20 cc. of nitric acid (specific weight 1.4). Whilst stirring and cooling intensively 150 gms. hydroxy-1-amino-2-methyl-6 benzene sulphonic acid-4 are slowly and gradually added to the said mixture, the temperature of the reaction mixture being maintained below 35° C. After the whole quantity of amino compound has been diazotized the reaction mixture is cooled to −5° C. The diazonium compound crystallizes for the greater part at a temperature of approximately 20° C. It is separated by filtering and washed with a little acetone.

The output amounts to 125 to 130 gms. of the diazonium compound which is obtained in the form of a light yellow substance with 2 molecules water of crystallisation. At reaction temperatures exceeding 35° C. a product of same quality is obtained, it is true, but the output is a little smaller.

*Example IV*

20.2 gms. amino-1 dimethylamino-4 benzene sulfonic acid-2 are dissolved in a mixture of 30 cc. of acetone, 70 cc. of water and 30 cc. of $HBF_4$ of 38% strength. Subsequently the solution is cooled to 0° C. whilst stirring. After that 30 cc. of a solution of sodium nitrite in water, which contains 7 gms. of sodium nitrite are slowly added, the temperature increasing to 7° C. After 10 minutes a further quantity of 200 cc. of acetone is added and the mixture cooled again to 0° C. After a few minutes the white sodium salt separates from the corresponding diazonium compound. After sucking off, washing and drying in the air the output is approximately 80% by weight.

*Example V*

23.9 gms. amino-1 hydroxy-2 naphthalene sulphonic acid-4 are suspended in a mixture of 30 cc. of water, 20 cc. of acetone and 20 cc. of concentrated hydrochloric acid. After the temperature has dropped to 5° C. due to cooling from without and stirring, a solution of 8.5 gms. sodium nitrite in 20 cc. of water is slowly added, the temperature rising to approximately 15° C. After about one-quarter of an hour a further quantity of 30 cc. of acetone is added, whereupon the sodium salt of diazonium-1 hydroxy-2 naphthalene sulphonic acid-4 crystallizes out.

What we claim is:

1. A method of diazotizing an amino aromatic sulphonic acid to the corresponding diazonium compound which comprises subjecting the said amino aromatic sulphonic acid compound to the action of nitrous acid in the presence of a ketone selected from the group consisting of acetone and butanone at a temperature of about 20° to 56° C. to thereby diazotize the said aromatic acid amino compound to the corresponding diazonium compound.

2. A method of diazotizing an amino aromatic sulphonic acid to the corresponding diazonium compound as claimed in claim 1 in which the ketone is butanone.

3. A method of diazotizing an amino aromatic sulphonic acid to the corresponding diazonium compound as claimed in claim 1 in which the ketone is acetone.

4. A method of diazotizing an ortho-hydroxy-amino aromatic sulphonic acid to the corresponding diazonium compound comprising subjecting the ortho-hydroxy-amino aromatic sulphonic acid to the action of sodium nitrite and a relatively strong inorganic acid in a liquid consisting substantially of water and about 20 to 75% by volume of acetone while maintaining the reaction temperature from about 20° to 56° C. to thereby diazotize the said aromatic acid amine to the sodium salt of the corresponding diazonium compound.

KLAAS HINDERIKUS KLAASSENS.
CORNELIS JOHANNES SCHOOT.

REFERENCES CITED

The following references are of record in the file of this patent:

FOREIGN PATENTS

| Number | Country | Date |
|---|---|---|
| 575,832 | Germany | Dec. 7, 1930 |
| 727,293 | France | June 15, 1932 |
| 769,810 | France | Sept. 3, 1934 |